Aug. 3, 1965 S. NISSIM 3,198,958

BISTABLE CIRCUIT

Filed Aug. 25, 1961 2 Sheets-Sheet 1

SAMUEL NISSIM
INVENTOR.

BY
HARVEY G. LOWHURST
ATTORNEY

SAMUEL NISSIM
INVENTOR.

BY
HARVEY G. LOWHURST
ATTORNEY

United States Patent Office 3,198,958
Patented Aug. 3, 1965

3,198,958
BISTABLE CIRCUIT

Samuel Nissim, Pacific Palisades, Calif., assignor, by mesne assignments, to The Bunker-Ramo Corporation, Stamford, Conn., a corporation of Delaware Filed Aug. 25, 1961, Ser. No. 133,857
11 Claims. (Cl. 307—88.5)

Figure 1:
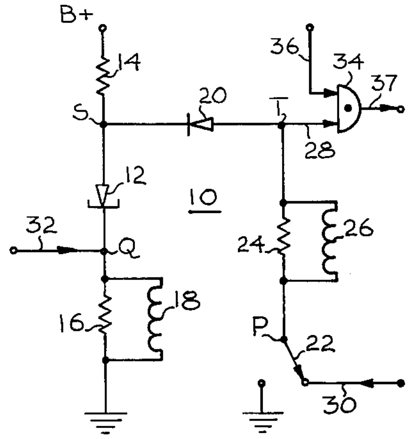

This invention relates generally to bistable circuit configurations finding particular utility as memory circuits characterized by a non-destructive read-out capability as well as in other electrical circuits wherein the high-speed switching of electrical signals is required.

The term memory circuit as used herein refers to a bistable circuit having a one-bit storage capacity utilized to store binary information. Such memory circuits are also referred to as flip-flops especially when used singly and may be assembled as building blocks to form many types of registers and memory arrays.

Heretofore, magnetic cores have been used extensively for random-access memories but their use is limited to applications which can tolerate slow access times in excess of 2 microseconds. This access time may be decreased by incorporating a facility for non-destructive read-out so that a read-out need not be followed by a rewrite which usually requires the same access time. In this manner, the access time may be cut in half. The term nondestructive read-out as used herein pertains to the property of the memory making it possible to ascertain the state to which it was set without modifying that state thereby obviating the necessity of rewriting or restoring the state.

In many computer applications the access time provided, even by nondestructive magnetic memories, is too slow and use must be made of the much faster externally energized memory circuits utilizing diodes in combination with capacitive impedances or transistors. Even though such memory circuits depend upon an external source and lose the stored information when the power fails, the faster access time offsets this disadvantage. One of the fastest externally energized memory circuits known to date is the tunnel diode properly biosed for bistable operation. Access times of tunnel-diode memories of less than 100 nanoseconds have been observed. See for example, "Computer Memories—A survey of the State-of-the-Art" by J. A. Rachman, Proceedings of the IRE, Vol. 49, No. 1, Page 104 (January 1961) and "A Survey of Tunnel-Diode Digital Techniques" by Sims, Beck, and Kamm, Proceedings of the IRE, Vol. 49, No. 1, Pages 136–137 (January 1961).

It is an object of this invention to provide an improved bistable circuit applicable as a memory circuit for the storage of a binary number and having a nondestructive read-out capability.

Briefly, the invention recognizes that the two different voltage drops across a negative resistance element, corresponding to the two stable states in which the element can be operated, can be used to back bias a unidirectional current conducting element such that a voltage pulse of a particular amplitude applied to the unidirectional element will forward bias the unidirectional element for one state of the negative resistance element but not the other thereby permitting the state of the negative resistance element to be read without destroying it.

In accordance with a preferred embodiment of the invention, a tunnel diode is properly loaded and biased for bistable operation, one stable state being generally known as the low-voltage state and the other state being generally known as the high-voltage state. Connected to the anode of the tunnel diode is a conventional diode which is normally back biased by the anode potential when the tunnel diode is in either one of its two unconditionally stable states of equilibrium, the magnitude of the back bias being-dependent upon the state of the tunnel diode. A clock pulse is applied to the cathode of the tunnel diode to lower the back bias on the conventional diode sufficiently to permit the application of a digit signal, representing the binary bit to be stored, to forward bias the conventional diode and thereby switch the state of the tunnel diode or to leave the conventional diode back biased and thereby have the state of the tunnel diode unchanged. Subsequent to the application of the digit signal, the state of the tunnel diode indicates the condition of the digit signal.

The condition of the digit signal, i.e., the state of the tunnel diode may be determined by application of the clock pulse and noting the effect of the clock signal upon the convenitonal diode. Since the magnitude of the back bias on the conventional diode is dependent upon the state of the tunnel diode, the effect of the clock pulse on the back bias of the conventional diode is such that it will be forward biased a small amount if the tunnel diode is in one state, but not sufficiently to switch the tunnel diode. If the tunnel diode is in its other state, application of the clock pulse does not forward bias the conventional diode.

Figure 2:
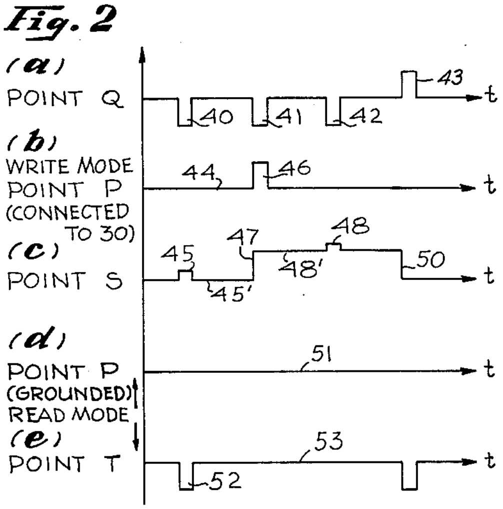
Figure 3:
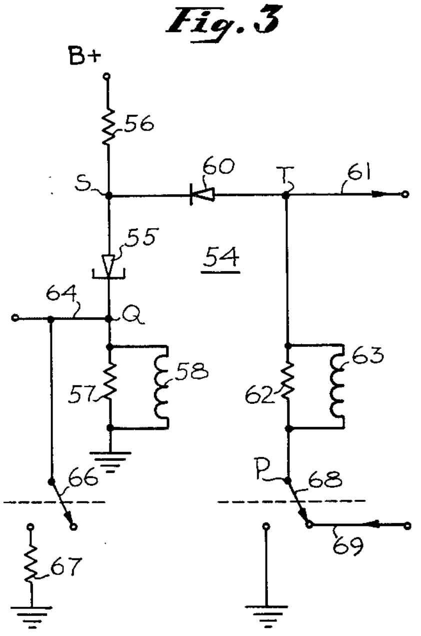
Figure 4:
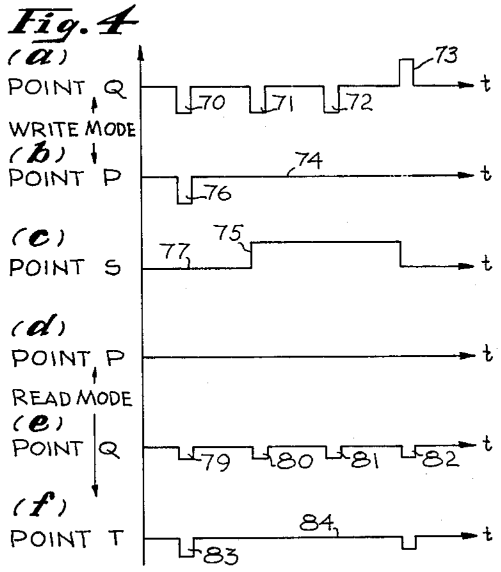
Figure 5:
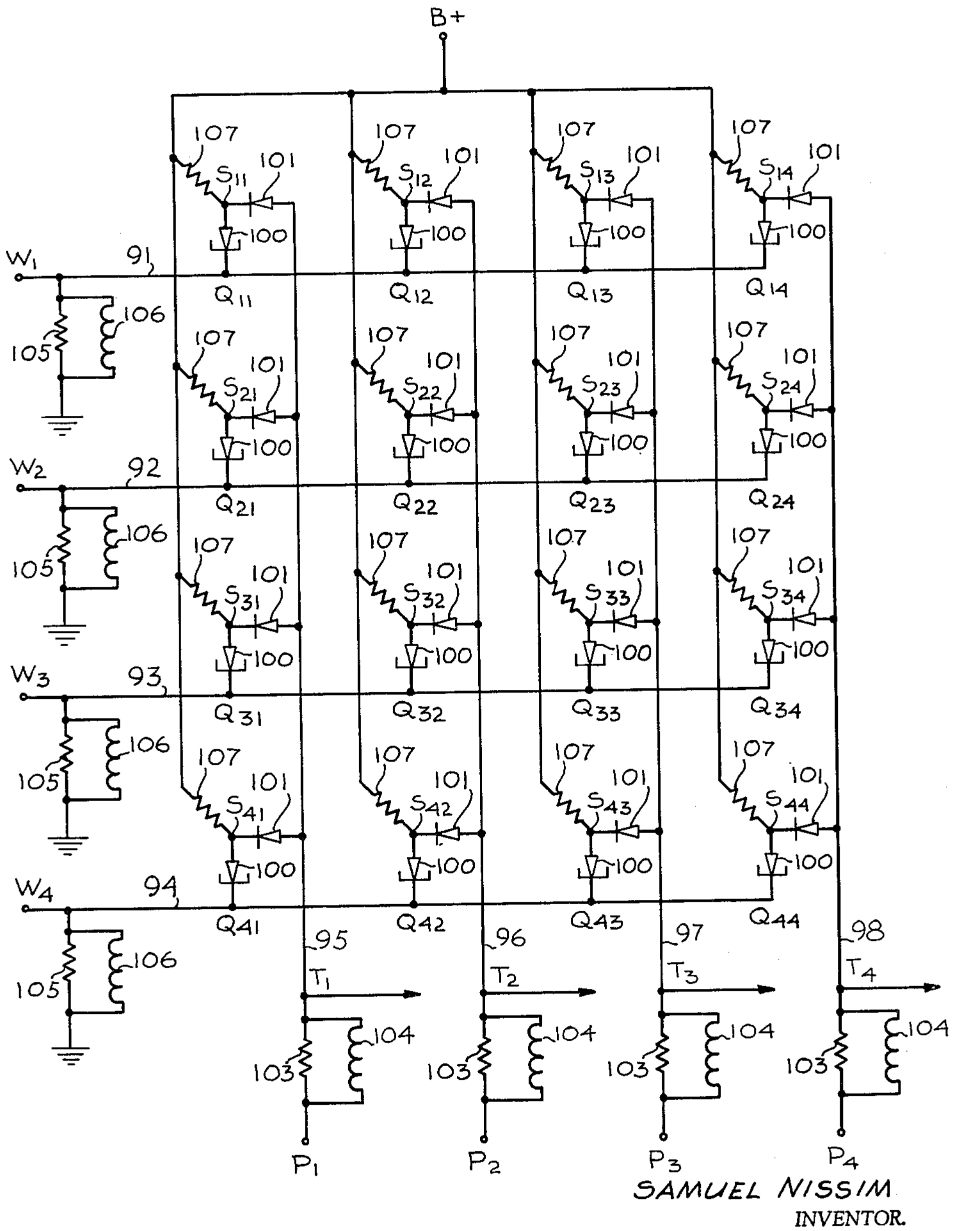

Other objects and a fuller understanding of the invention may be had by referring to the following description, taken in conjunction with the accompanying drawings, in which:

FIGURE 1 is a schematic circuit diagram of the memory circuit of this invention;

FIGURE 2 includes several timing diagrams illustrating the wave forms at different points of the circuit of FIGURE 1;

FIGURE 3 is a schematic circuit diagram of an alternate embodiment of this invention;

FIGURE 4 includes several timing diagrams illustrating the wave forms at different points of the circuit of FIGURE 3; and FIGURE 5 is a schematic circuit diagram of a computer-memory array constructed from a plurality of the circuits shown in FIGURE 1.

Referring now to the drawings and particularly to FIGURE 1 thereof, the memory circuit there shown and generally designated by reference numeral 10 comprises a negative resistance device such as a tunnel diode 12 forward biased by a source of biasing potential generally indicated by reference character B+ and loaded by resistive impedances 14 and 16 and inductive impedance 18 to provide biastable operation. Tunnel diodes, also known as Esaki diodes, are devices whose static voltage characteristic exhibits a negative resistance region between two regions of positive resistance due to a decrease of tunneling current when the applied voltage reaches the level of the so-called forbidden gap of energies in the p-type material and is well known to those skilled in the art for its bistable operation when properly loaded and biased. Diodes which do not exhibit a negative resistance region will be referred to herein as "conventional" diodes. Conventional diodes have a very large impedance when back biased and a relatively small impedance when forward biased and are therefore unidirectional conductors.

A conventional diode 20 is connected to tunnel diode 12 so that the cathode of conventional diode 20 is joined to the anode of tunnel diode 12. The junction point formed by the terminal leads connecting diodes 12 and 20 is designated by reference character "S." The anode of conventional diode 20 is connected to a switch means 22 through a parallel combination of a resistive impedance 24 and an inductive impedance 26. Output lead 28, also descriptively referred to as read line, is connected to a network point designated "T." Input lead 30, also descriptively referred to as digit or write line, is connected to one of the two poles of switching means 22, the other pole being grounded. Network point designated "P" is located at the pole selector terminal of switch means 22.

An input lead 32, also descriptively referred to as clock line, is connected to a circuit junction designated "Q." An AND gate circuit 34 controlled by a read-command signal appearing on a control line 36 may be utilized to control the read signal on read line 28. The gated read signal is applied to gate read line 37.

Memory circuit 10 has two modes of operation, one mode being referred to as the "write" mode and the other being referred to as the "read" mode. During the write mode the binary bit to be stored is applied, from a register or some external storage means, to memory circuit 10 via write line 30. At the same time a clock pulse is applied to clock line 32 making memory circuit 10 operative for storage of the binary bit. During the write operation, switch means 22 connects circuit point P to write line 30.

During the read mode, an indication of the binary bit stored in memory circuit 10 may be obtained on read line 28 which may be stored in a register or other circuitry requiring an indication of the stored binary number via gated read line 37. The binary bit is read when a clock pulse is applied to clock line 32 and circuit point P is grounded through switch means 22.

In operation, tunnel diode 12 is properly biased by biasing potential B+ and resistively loaded by resistive impedances 14 and 16 so that the total circuit resistance is positive and the load line intersects the static voltage-current characteristic of the tunnel diode at three points. Biased in this manner, tunnel diode 12 has two unconditionally stable voltage states, one in the voltage range below the "peak" voltage and the other one above the "valley" voltage.

During the write mode of operation, negatively going clock pulses 40–42 are applied at Q via clock line 32 as shown in FIGURE 2(*a*). Assume that tunnel diode 12 is in its stable low-voltage state and that the binary bit to be written is a binary zero which is represented by the absence of a pulse on line 44, FIGURE 2(*b*). The binary zero (no pulse) is applied at P via write line 30. The magnitude of clock pulses 40–42 are selected so that conventional diode 20 assumed to be back biased by tunnel diode 12 in its low-voltage state becomes slightly forward biased to permit current flow therethrough. However the magnitude of clock pulse 40 does not lower the potential of point Q sufficiently to permit current flow through tunnel diode 12 to move the load line past the "peak" voltage point of the tunnel-diode characteristic. In other words, clock pulse 40 raises the potential of point S, as shown by pulse 45, FIGURE 3(*c*), but not sufficiently to switch tunnel diode 12 to its high-voltage state. Accordingly, the voltage of point S drops back to its former value at the end of clock pulse 40. Accordingly, writing a binary bit of zero into the circuit leaves point S unchanged, thereby providing an indication of a binary zero.

Now assume that the binary bit to be written is a binary one which is represented by positive going voltage pulse 46, FIGURE 2(*b*). Also assume tunnel diode 12 to be in its stable low-voltage state. Application of clock pulse 41 to clock line 32 causes the potential of point S to be raised as before. Simultaneous application of write pulse 46 to write line 30 further raises the potential at point S. The magnitude of write pulse 46 is selected so that, together with clock pulse 41, the voltage of point S is raised sufficiently to permit a current flow which is large enough to increase the current through tunnel diode 12 past the peak current point so that tunnel diode 12 switches to its stable high-voltage state as shown by positive going pulse 47, FIGURE 2(*c*).

Consequently, a binary zero is represented by a potential of point S corresponding to the low-voltage state and a binary one is represented by a potential at point S corresponding to the high-voltage state of tunnel diode 12.

It is also worth noting that, once tunnel diode 12 is in its stable high-voltage state, (FIGURE 2(*c*), 47) the application of a clock pulse 42 to clock line 32 does not cause tunnel diode 12 to switch to its low-voltage state since the potential at point S is raised rather than lowered as shown by pulse 48, FIGURE 2(*c*). Further, circuit 10 may be reset by the application of a positive going clock pulse 43 to clock line 32. The magnitude of pulse 43 is selected so that the potential difference between points S and Q is lowered below the valley potential so that tunnel diode 12 switches back to its stable low-voltage state as shown by the negative step function 50, FIGURE 2(*c*).

During the read mode of operation, a read-command signal appears on line 36 in synchronism with the signal on clock line 32 and switch means 22 is switched so that point P is grounded as shown by line 51, FIGURE 2(*d*). Assume first that circuit 10 has stored a binary zero so that point S is at a voltage corresponding to the stable low-voltage state as shown at 45′, FIGURE 2(*c*). As already stated the magnitude of clock pulse 40 is carefully selected to raise the potential of point S such that the resulting current through conventional diode 20 is less than required to switch tunnel diode 12 to its high-voltage state. This limited current also flows through load impedances 24 and 26 and thereby lowers the potential at point T (since point P is grounded) as shown at 52, FIGURE 2(*e*). This is read pulse 52 which is available on read line 28 and indicates the storage of a binary zero in memory circuit 10. In this manner circuit 10 is being interrogated without destroying the storage indicated by its state.

If tunnel diode 12 is in its high-voltage state indicating the storage of a binary one so that junction S has a high potential as shown at 48′, FIGURE 2(*c*), the magnitude of pulse 41 applied at Q is insufficient to overcome the back bias across conventional diode 20 and point T remains effectively isolated from junction S. Consequently, the potential at point T remains substantially unchanged as shown at 53, FIGURE 2(*e*) and there is no change in output (no pulse) on read line 28, thereby indicating the storage of a binary one. Again, interrogation is accomplished without destroying the stable high-voltage state of tunnel diode 12.

Memory circuit 10 has many other useful applications in addition to being a nondestructive read-out memory device. For example, circuit 10 may be utilized as an ultrafast switch for selectively providing an output signal on line 28 corresponding to an input signal on line 32; or an output signal on line 32 corresponding to an input signal on line 28. The switch is opened and closed by applying the proper potentials to points P and Q. When this circuit is operated as a switch in the closed position, point P must be grounded.

Another embodiment of this invention is shown in FIGURE 3 in which a tunnel diode 55 is loaded and biased for bistable operation by connecting thereto load impedances 56, 57 and 58 and a source of positive biasing voltage B+. The cathode of a conventional diode 60 is connected to the anode of tunnel diode 55, the point of connection defining circuit point S. The anode of diode 60, defining circuit point T, is connected to a read line 61 and to circuit point P through load impedances 62 and 63. A clock line 64 is connected to the cathode of tunnel diode 55 at circuit point Q.

A switch means 66 selectively connects clock line 64 through an attenuation impedance 67 to ground. A further switch means 68 connects circuit point P selectively to a write line 69 and to ground. Switch means 66 ad 68 are ganged as indicated by the dotted line in the drawing and are shown in a position corresponding to the write mode of operation. In the READ mode of operation, circuit point P is grounded and clock line 64 is connected to grounded attenuation impedance 67.

During the write mode of operation of circuit 54, negative going clock pulses 70 to 72, FIGURE 4(*a*), are applied to circuit point Q via clock line 64. Assume that tunnel diode 55 is in its low-voltage state and that the binary bit to be written is a binary one which is represented by a no pulse voltage as shown at 74, FIGURE 4(*b*). The binary one is applied at circuit point P via write line 69. The magnitude of clock pulse 71 is selected, in contrast to clock pulse 40 for circuit 10, so that conventional diode 60 is forward biased to a degree to permit current flow through diode 60 of sufficient magnitude to increase the current flow through tunnel diode 55 to a point where load line moves past the peak voltage point. At that instant, tunnel diode 55 flips into its high-voltage state. As soon as tunnel diode has flipped, point S which was at a voltage corresponding to the stable low-voltage state now is raised to a voltage corresponding to the high-voltage state. Upon termination of the clock pulse 71, current flow ceases and conventional diode 60 is back biased into its cut-off or high-impedance region by the high voltage at circuit point S as shown by positive going pulse 75, FIGURE 4(*c*). The high voltage at circuit point S isolates tunnel diode 55 or point S from write line 69.

Now assume that the binary bit to be written is a binary zero which is represented by negative going voltage pulse 76. Also assume tunnel diode 55 to be in its stable low-voltage state. Application of write pulse 76 to write line 69 causes the potential of point T to be lowered. Likewise, the application of clock pulse 70 to clock line 64 lowers the potential of circuit point S. The magnitude of write pulse 76 is selected so that conventional diode 60 remains substantially nonconductive during simultaneous application of clock pulse 70 and write pulse 76. Consequently tunnel diode 55 is not switched during the storage of a binary zero as shown by 77, FIGURE 4(*c*).

Consequently, a binary one is represented by a potential corresponding to the stable high-voltage state and a binary zero is represented by a potential corresponding to the stable low-voltage state of tunnel diode 55. Also, once tunnel diode 55 is in its high-voltage state, the application of a signal corresponding to a binary one, that is a no pulse, does not cause tunnel diode 55 to switch back to its low-voltage state. Circuit 54 may be reset by the application of a sufficiently high positive pulse 73 to clock line 64 since this will cause a decrease of current through tunnel diode 55 below the "valley" current point.

During the read mode of operation, both switch means 66 and 68 are switched so that clock line 64 and point P are grounded. Clock pulses 70 to 72, now grounded through resistive impedance 67, are atenuated and are shown as attenuated clock pulses 79 and 81. Of course, switch means 66 and resistor 67 may be eliminated if some other means is utilized to apply an attenuated clock pulse directly to clock line 64.

In operating circuit 54 in the read mode, assume first that a binary zero is stored so that point S is at low voltage as shown at 77, FIGURE 4(*c*). The amplitude of attenuated clock pulse 79 is selected to be less than required to forward bias conventional diode 60 sufficiently to switch tunnel diode 55 to its stable high-voltage state as was done by clock pulse 70. The amplitude of pulse 79 however is selected sufficiently large to forward bias conventional diode 60 and to cause a limited current to flow therethrough. This current also flows through load impedances 62 and 63 and thereby lowers the potential at point T (since point P is grounded during the read mode) as shown by FIGURE 4(*f*). This limited current flow provides read pulse 83 which is available on read line 61 and which indicates the storage of a binary zero in memory circuit 54 without destroying that storage.

If tunnel diode 55 is in its high-voltage state indicating the storage of a digital one so that junction S has a high potential as shown at 75, FIGURE 4(*c*), the magnitude of pulse 80 applied at Q is insufficient to overcome the back bias across conventional diode 60 and point T remains effectively isolated from junction S. Consequently, the potential at point T remains substantially equal to zero as shown at 84, FIGURE 4(*f*) and there is no output signal on read line 61. Again, read-out is accomplished without destroying the high-voltage state of tunnel diode 12.

For purposes of illustration only, the following table of circuit parameters is given, it being understood that such values are in no way intended to limit the invention. A circuit constructed in accordance with such parameters had an access time of 20 nanoseconds.

| | |
|---|---|
| Tunnel diode 55: | I N 1976. |
| Low voltage (high current) | 0.08 volt. |
| High voltage (low current) | 0.45 volt. |
| Conventional diode 60 | I N 270. |
| $B^+$ supply | 1.5 volts. |
| Resistor 56 | 470 ohms. |
| Resistor 57 | 47 ohms. |
| Resistor 62 | 6800 ohms. |
| Inductor 58 | 10 microhenry. |
| Inductor 63 | 47 microhenry. |
| Clock pulses 70 to 73 | −.75 volt. |
| Clock pulses 79 to 82 | −.2 volt. |
| Write pulse 76 | −.50 volt. |
| Reset pulse 78 | −1.5 volts. |

The memory circuit of this invention may also be operated with positive clock pulses and positive write pulses. More specifically in a further embodiment of this invention, positive clock pulses may be applied to the point P and positive write pulses may be applied to point Q. In effect this is an exchange of the clock line and the digit line with a change of input pulse polarity.

Further embodiments of the memory circuit of this invention may be provided by reversing the anode and the cathode of the tunnel diode and the conventional diode in circuits 10 and 54 and changing the biasing potential to $B^-$. As a consequence of reversing the terminal leads of both diodes, the polarity of the clock pulses and the write pulses must likewise be reversed.

Switch means 22, 66 and 68 have been shown in FIGURES 1 and 3 as mechanical switches merely for illustrative purposes. In practice, fast acting electronic switches, such as for example, switching circuits utilizing diodes and actuated by the READ control signal on line 36 (FIGURE 1) from a central computer command, may be utilized.

Circuit 10 even though described as an ultrafast nondestructive one-bit memory circuit useful as a memory cell from which a computer memory array may be constructed, has many other useful purposes as will be obvious to those skilled in the art. Circuit 10 is primarily a bistable circuit and may be used for all applications requiring a bistable circuit. Its particular advantages are found in its potential capability of providing access times of less than a nanosecond and its property of nondestructive read-out. As such the memory circuit of this invention is ideally suitable to form the stages of a register such as may be used, by way of example for forming the product of numbers with parallel adders. Also circuit 10 is eminently useful as a flip-flop in connection with the construction of logical networks.

FIGURE 5 shows a random-access memory array 90 which includes 16 memory circuits of the type shown in FIGURE 1 and arranged to form a four by four matrix. Memory array 90 is useful to store four words of four binary bits each. Much larger arrays (and stacks of arrays) may be formed but the one here shown fully illustrates the method of combining the circuits of this invention into arrays.

The clock pulses for storing the four words are applied respectively to terminals designated $W_1$, $W_2$, $W_3$ and $W_4$, and the write pulses representing the four digits of each word are applied, respectively, to terminals designated $P_1$, $P_2$, $P_3$ and $P_4$. Terminals W are connected, via clock lines 91, 92, 93 and 94, to the cathodes of tunnel diodes 100, the junction points being designated Q just as in circuit 10, with subscripts to first identified word and then the digit of the word. Accordingly, $Q_{23}$ designates the junction to which a clock pulse must be applied to write the third digit of the second word. The various clock lines 91 to 94 are grounded through impedances 105 and 106.

Terminals P are connected, via digit lines 95, 96, 97 and 98 to the anodes of conventional diodes 101, and also include resistive and inductive load impedances 103 and 104 across which the read pulse is developed. The read pulses may be obtained from terminals designated $T_1$, $T_2$, $T_3$ and $T_4$ each one providing a different digit of the four digit word stored. The anodes of tunnel diodes 100 and the cathodes of conventional diodes 101 are joined at junctions designated S to which is also connected a biasing impedance 107 coupled to a positive biasing source $B^+$. Junctions labeled S are the junctions which are either at a high or a low potential depending on the binary digit written into the individual memory circuits and subscripts, just like the subscripts used for the junction Q, have been used to identify the various words and digits.

Switch means (not shown to retain simplicity) similar to switch means 22 of circuit 10 (FIGURE 1) are connected to terminals P to switch between the write and the read modes of operation. As already explained, during the read mode, terminals P are grounded.

An example will illustrate the operation of memory array 90. Assume it is desired to write the four digit binary word 1101 into the first row of memory circuits from a parallel-output four-stage register. The four stages of the register are connected respectively to the terminals $P_1$, $P_2$, $P_3$, and $P_4$ and a clock pulse is applied to terminal $W_1$. Since clock line 91 is connected to junctions $Q_{11}$, $Q_{12}$, $Q_{13}$ and $Q_{14}$, the clock pulse is simultaneously applied to each of those junctions. Simultaneously therewith write pulses corresponding to the binary word 1101 are applied to terminals $P_1$, $P_2$, $P_3$ and $P_4$. These pulses correspond to pulse 46, FIGURE 2(*b*), for a binary one and no pulse as shown at 44, FIGURE 2(*b*), for a binary zero.

The application of a clock pulse and the several write pulses to the several circuits will determine the state to which the circuits are set. If the write pulse is a binary one as for example, pulse 46, FIGURE 2(*b*), the tunnel diode is switched to a voltage corresponding to its high-voltage state and if the digit pulse is a binary zero, as for example line 44, FIGURE 2(*b*), the tunnel diode remains in its low-voltage stage. Accordingly, junctions $S_{11}$, $S_{12}$, and $S_{14}$ are switched to their high-voltage states and junction $S_{13}$' remains in its low-voltage state.

During the read mode of operation, a clock pulse is applied to terminal $W_1$ (which may also be the clock pulse suitably attenuated by a switching means as shown in FIGURE 3). Also terminals $P_1$, $P_2$, $P_3$ and $P_4$ are grounded (or held at zero voltage). The digits are read at terminals $T_1$, $T_2$, $T_3$ and $T_4$ in a manner similar to that explained in connection with the description of FIGURE 2.

As will be obvious to those skilled in the computer art, memory array 90 may be utilized in connection with the serial writing of information as well. One example of a serial write-in is to connect the shift register, which serially provides the digits of the word to be written, to a terminal such as $P_1$ and sequentially applying write pulses to terminals $W_1$, $W_2$, $W_3$ and $W_4$ in synchronism with the shifting of the shift register. Many other well-known schemes for writing into and reading from a register such as shown in FIGURE 5 will be self-evident to those familiar with the use to which random-access memories may be put.

The array of FIGURE 5 may also be utilized as a switching array to selectively connect any terminal T with any terminal W thereby providing an output signal on terminal T to correspond to an input signal on terminal W, and vice versa, in a manner similar to the utilization of a circuit 10 as a switch as has already been explained. For example, to connect a selected terminal W to a selected terminal T, the tunnel diode connecting the selected terminals must be maintained at a voltage corresponding to its stable low-voltage state.

The state of junction points S may be controlled by applying suitable trigger voltages to terminals P. For example, if it is desired to connect input terminal $W_2$ to output terminals $T_1$ and $T_4$, and assuming that all junctions are initially at a voltage corresponding to the high-voltage state of the tunnel diodes, negative going pulses (just like reset pulse 49, FIGURE 2(*b*)) are applied to terminals $P_1$ and $P_4$ simultaneously with a clock pulse to terminal $W_2$. This switches the corresponding tunnel diodes to lower the voltage of junctions $S_{21}$ and $S_{24}$ to a potential corresponding to the low-voltage state of the tunnel diodes. To close one of the connections, a positive going pulse (just like set pulse 46, FIGURE 2(*b*)) is applied to the corresponding P terminal simultaneously with a clock pulse to switch the diode back to its high-voltage state and thereby isolate terminal T from terminal W.

There has been described a new and novel memory circuit which permits nondestructive read-out of binary information stored therein and which provides access-time capabilities of less than a nanosecond. The memory circuit of this invention is admirably suited for all applications utilizing bistable circuits and switching circuits and is also eminently useful as a building block for registers and memory and switching arrays.

What is claimed is:

1. A switch circuit for selectively affecting coupling between first and second conductors comprising: a first circuit branch including a circuit element having a negative resistance operating region bounded by two positive resistance operating regions and biasing means for establishing first and second stable operating states for said circuit element; a second circuit branch including a unidirectional current conducting element; means coupling said second circuit branch to said first circuit branch such that said unidirectional element is back biased by a low voltage when said circuit element is in its first stable state and by a high voltage when said circuit element is in its second stable state; means selectively establishing the operating state of said circuit element; means connecting said first conductor to said first circuit branch; means applying pulse information to said first conductor sufficient in amplitude to overcome said back bias and initiate current flow in said unidirectional element in accordance with said pulse information when said circuit element is in its low-voltage state but insufficient in amplitude to overcome said back bias when said circuit element is in its high-voltage state; and means connecting said second conductor to said unidirectional element for sensing current flow therein.

2. A memory circuit comprising: a first circuit branch including a circuit element having a negative resistance operating region bounded by two positive resistance operating regions and biasing means for establishing first and second stable operating states for said circuit element; a second circuit branch including a unidirectional current conduting element; means coupling said second circuit branch to said first circuit branch such that said unidirectional element is back biased by a low voltage when said circuit element is in its first stable state and by a high voltage when said circuit element is in its second stable state; means for applying a clock pulse to said circuit of predetermined polarity and sufficient in amplitude to overcome said low voltage bias and forward bias said unidirectional element, but insufficient in amplitude to switch said circuit element from its first stable state to its second stable state; and means for applying a write pulse representing a binary digit to said circuit, the polarity and amplitude of said write pulse for one binary digit being sufficient to aid said clock pulse so that upon their simultaneous application said circuit element is switched to said second stable state.

3. A memory circuit comprising: a first circuit branch including a circuit element having a negative resistance operating region bounded by two positive resistance operating regions and biasing means for establishing first and second stable operating states for said circuit element; a second circuit branch including a unidirectional current conducting element; means coupling said second circuit branch to said first circuit branch such that said unidirectional element is back biased by a low voltage when said circuit element is in its first stable state and by a high voltage when said circuit element is in its second stable state; means for applying a clock pulse to said circuit of predetermined polarity and sufficient in amplitude to overcome said low voltage back bias and forward bias said unidirectional current conducting element but insufficient in amplitude to switch said circuit element from its first stable state to its second stable state; means coupled to said second circuit branch for selectively operating said circuit in a write mode and a read mode; means for applying a write pulse representing a binary digit to said circuit simultaneously with said clock pulse during the write mode of operation, the polarity and amplitude of said write pulse for one binary digit being selected to aid said clock pulse in forward biasing said unidirectional current conducting element sufficiently to switch said circuit element to said second stable state; and means for receiving a read pulse representing the state of said circuit element as a function of current flow in said unidirectional current and conducting element in response to said clock pulse during the read mode of operation.

4. A nondestructive memory circuit comprising: a first circuit branch including a circuit element having a negative resistance operating region bounded by two positive resistance operating regions and biasing means for establishing first and second stable operating states for said circuit element; a second circuit branch including a unidirectional current conducting element; means coupling said second circuit branch to said first circuit branch such that said unidirectional element is back biased by a low voltage when said circuit element is in its first stable state and by a high voltage when said circuit element is in its second stable state; means for applying a clock pulse to said circuit of predetermined polarity and sufficient in amplitude to overcome said low voltage bias and switch said circuit element to said second stable state; means for simultaneously applying a write pulse representing a binary digit to said circuit, the amplitude and polarity of said write pulse for one binary digit being sufficient to oppose said clock pulse and to prevent switching said circuit element to said second state; and means for providing an indication of the stable operating state of said circuit element without changing the stable operating state of said circuit element.

5. A memory circuit suitable for the one-bit storage of a binary bit upon the application of a write signal and the nondestructive read-out of the stored binary bit upon the application of a read signal, said circuit comprising: a tunnel diode; biasing means connected to said tunnel diode for operating said tunnel diode in a first stable low-voltage state and in a second stable high-voltage state; a binary bit input path comprising the series connection of a load impedance and a conventional diode between a binary number input terminal and a first electrode of said tunnel diode; a write signal applied to a second electrode of said tunnel diode and having a voltage level in response to which said tunnel diode switches from its low-voltage to its high-voltage state; a binary input signal representing the binary bit to be stored applied to said input terminal coincident with said write signal and having a first voltage level which does not affect the operation of said write signal and having a second voltage level which is of sufficient magnitude to oppose the operation of said write signal and thereby prevent the switching of said tunnel diode; and a read signal applied to the second electrode of said tunnel diode having a voltage level in response to which said conventional diode becomes conductive if said tunnel diode is in its low-voltage state but remains substantially non-conductive if said tunnel diode is in its high-voltage state, said read signal voltage level being of insufficient magnitude to switch said tunnel diode, said current when flowing through said load impedance providing an indication of the state of said circuit.

6. A bistable circuit comprising: a first circuit branch including a circuit element having a negative resistance operating portion bounded by two positive reisstance optrating regions and biased for operation in a high-voltage stable state and a low-voltage stable state; a second circuit branch coupled to said first circuit branch and including a unidirectional current conduction element, said unidirectional element being normally biased so that substantially no current flows therethrough when said circuit element is in either voltage stable state; a switching means coupled to said second circuit branch for operating said bistable circuit in either a write or a read mode, said switching means selectively connecting said second circuit branch to a binary signal input terminal for the write mode of operating and to a reference bias for the read mode of operation; means for applying a binary signal of predetermined polarity and amplitude representative of a binary bit to said input terminal; and clock pulse means for applying a clock signal of predetermined polarity and amplitude to said first circuit branch, the simultaneous application of said clock signal and a selected one of said binary signals forward biasing said conduction means to pass a current of sufficient magnitude to cause said circuit element to switch from its low voltage to its high voltage stable state.

7. A bistable circuit operable in a write and read mode of operation in response to a write and a read signal respectively applied to a clock input terminal, said circuit storing a binary bit applied to a write input terminal in its write mode of operation and nondestructively providing an indication of the stored binary bit at a read output terminal in its read mode of operation, said circuit comprising: a circuit element having a negative resistance operating portion bounded by two positive resistance operating regions; biasing means and first impedance means coupled to said circuit element, the positive impedance of said first impedance means being selected to exceed the negative impedance of said circuit element to provide bistable operation of said circuit element; unidirectional current conducting means coupled to one of the terminals of said circuit element; switching means; and second impedance means for coupling said unidirectional current conducting means to said switching means, said read output terminal being connected to the junction between said unidirectional current conducting means and said second impedance means, said switching means selectively coupling said second impedance means to said write input terminal during the write mode of operation and to a reference bias during the read mode of operation, said clock input terminal being connected to the other terminal of said circuit element.

8. A bistable circuit operable in a write and a read mode of operation in response to a write and read signal respectively applied to a clock input terminal, said circuit storing a binary bit represented by a digit signal applied to a write input terminal in its write mode of operation and nondestructively providing an indication of the stored binary bit at a read output terminal in its read mode of operation, said circuit comprising: a circuit element having two terminals and having a negative resistance operating portion bounded by two positive resistance operating regions; biasing means and first impedance means coupled to one terminal of said circuit element, the positive impedance of said first impedance means being selected to exceed the negative impedance of said circuit element to provide bistable operation of said circuit element; unidirectional current conducting means coupled to said one terminal of said circuit element; switching means; and second impedance means for coupling said unidirectional current conducting means to said switching means, said output terminal being connected to the junction between said unidirectional current conducting means and said second impedance means, said switching means selectively coupling said second impedance means to said write input terminal during the write mode of operation and to a reference bias during the read mode of operation, the clock input terminal being connected to the other terminal of said circuit element, the magnitude and polarity of said write signal, read signal and the digit signal being selected so that upon the simultaneous application of a write signal and a digit signal representing one of the binary bits said unidirectional current conducting means is being forward biased to pass sufficient current to cause said circuit element to operate in its high-voltage stable state, and upon the simultaneous application of said write signal and a digit signal representing the other of the binary bits said unidirectional current conducting means is being biased to pass insufficient current to change the state of said circuit element, and upon the application of a read signal said unidirectional current conducting means is being biased to pass a current in accordance with the state of said circuit element, said last named current being insufficient to change the state of said circuit element.

9. A memory circuit having a stable low-voltage state and a stable high-voltage state into which a binary bit may be stored upon the application of a write signal and from which said stored binary bit may be read-out upon the application of a read signal without changing the operating state of said memory circuit, comprising: tunnel diode means; biasing circuit means coupled to said tunnel diode means for operating said tunnel diode means in said stable low-voltage state and said stable high-voltage state; unidirectional current conducting means coupled to said tunnel diode means and normally back biased when said tunnel diode means is operating in either of its stable states; digit circuit means for applying a digit signal representing the binary bit to be stored in said memory circuit to said unidirectional current conducting means; write signal circuit means for applying a write signal to said unidirectional current conducting means, the polarity and magnitude of said digit signal and said write signal being selected so that for a selected binary bit said unidirectional current conducting means is being sufficiently forward biased to cause current flow therethrough and through said tunnel diode means to change the operating state of said tunnel diode means; read signal circuit means for applying a read signal to said undirectional current conducting means, the polarity and magnitude of said read signal being selected so that for a selected stable state of said tunnel diode means said unidirectional current conducting means is being forward biased to cause current flow therethrough, said limited current flow being insufficient to change the operating state of said tunnel diode means.

10. A one-bit binary memory circuit having a write and a read mode of operation and actuated by a clock signal applied to a clock input terminal for the storage of a binary signal representing either a binary one bit or a binary zero bit applied to a write input terminal and for the nondestructive read-out of said stored binary bit from a read output terminal, said circuit comprising: tunnel diode means having two electrodes; a source of biasing potential; first impedance means connecting said source of biasing potential to one electrode of said tunnel diode means, said tunnel diode means thus biased having a stable low-voltage and a stable high-voltage mode of operation and being operative to switch from said low-voltage to said high-voltage mode in response to a predetermined increase of current flow therethrough and switch from said high-voltage to said low-voltage mode in respect to a predetermined decrease of current flow therethrough, the other electrode of said tunnel diode means being coupled to said clock input terminal; and an input path comprising a series connection of a second impedance means and a conventional diode means connected between said write input terminal and the junction formed between said tunnel diode means and said first impedance means, the junction between said second impedance means and said conventional diode means being coupled to said read output terminal, said clock signal having a predetermined polarity and having a write voltage level and a read voltage level, said write voltage level being selected so that upon the simultaneous application of said clock signal and one of said binary signals said conventional diode means is being forward biased to cause current flow therethrough and through said tunnel diode means of a magnitude sufficient to switch said tunnel diode means from its low-voltage to its high-voltage state, said write voltage level also being selected so that upon the simultaneous application of said clock signal and the other of said binary signals said conventional diode means is biased to cause current flow of insufficient magnitude therethrough and through said tunnel diode means to cause a change of state of said tunnel diode means, said conventional diode means being back-biased when said tunnel diode means is in either of its stable voltage modes, said read voltage level being selected so that application of said clock signal in read mode of operation forward biases said conventional diode means to cause current flow of sufficient magnitude through said second impedance means to obtain a read output signal when said tunnel diode means is in its low-voltage state and of insufficient magnitude to switch said tunnel diode means to its high-voltage state.

11. A memory circuit suitable for the one-bit storage of a binary bit upon the application of a write signal and the nondestructive read-out of the stored binary bit upon the application of a read signal, said circuit comprising: a tunnel diode; biasing means connected to said tunnel diode for operating said tunnel diode in a first stable low-voltage state and in a second stable high-voltage state; a switching means having a pole selector and two poles, a binary bit input path comprising the series connection of a load impedance and a conventional diode between the pole selector of said switching means and a first electrode of said tunnel diode; the poles of said switching means being respectively connected to a binary number input terminal and a reference bias; means for switching said switching means between a write mode and a read mode of operation; a write signal applied to a second electrode of said tunnel diode and having a voltage level in response to which said tunnel diode switches from its low-voltage to its high-voltage state; a binary input signal representing the binary bit to be stored applied to said input terminal during the write mode of operation and coincident with said write signal and having a first voltage level which does not affect the switching action of said write signal and having a second voltage level which inhibits the switching action of said write signal thereby prevent said switching of the tunnel diode, said conventional diode being back-biased when said tunnel diode is operating in either stable voltage state; a read signal applied to said second electrode of said tunnel diode during the read mode of operation having a voltage level in response to which said conventional diode becomes conductive if said tunnel diode is in its low-voltage state but remains substantially nonconductive if said tunnel diode is in its high-voltage state, said read signal voltage level being of insufficient magnitude to switch said tunnel diode, said current when flowing through said load impedance providing an indication of the state of said circuit.

(References on following page)

References Cited by the Examiner

UNITED STATES PATENTS 2,975,377 3/61 Price et al. ---------- 307—88.5

OTHER REFERENCES

Akmenkalns: IBM Tech. Disclosure Bulletin, vol. 3, No. 8, January 1961, (page 38 relied on).

Bauer et al.: IBM Tech. Disclosure Bulletin, vol. 3, No. 3, August 1960, (page 43 relied on).

Chaplin et al.: 1961 International Solid-State Circuits Conference February 1961, (pages 40, 41), (page 41 relied on).

Mauch: "Tunnel Diode as a Pulse Generator," Electronic Industries, February 1961, (pages 106, 107 relied on).

Neff et al.: 1960 International Solid-State Circuits Conference, February 1960 (pages 16, 17), (page 17 relied on).

Richards (I): Arithmetic Operations In Digital Computers, 6th Printing, August 1957, Van Nostrand, (page 79 relied on).

Richards (II): Digital Computer Components and Circuits, November 1957, Van Nostrand, (page 54 relied on).

Wolff: IBM Tech. Disclosure Bulletin, vol. 3, No. 11, April 1961, (page 41 relied on).

ARTHUR GAUSS, *Primary Examiner.*

BENNETT G. MILLER, *Examiner.*